United States Patent [19]

Riggs

[11] 3,743,430
[45] July 3, 1973

[54] LIGHT TRANSMISSION MONITOR
[75] Inventor: William A. Riggs, Pasadena, Tex.
[73] Assignee: Shell Oil Company, Houston, Tex.
[22] Filed: Nov. 12, 1971
[21] Appl. No.: 198,288

[52] U.S. Cl................. 356/207, 356/206, 356/222, 356/229, 250/220 R
[51] Int. Cl. ........................................... G01n 21/12
[58] Field of Search.................. 356/204, 206, 207, 356/222, 229; 250/220 R; 346/65, 66

[56] References Cited
UNITED STATES PATENTS

| | | | |
|---|---|---|---|
| 3,526,460 | 9/1970 | Webb............................. | 356/204 X |
| 3,447,370 | 6/1969 | Tanzman....................... | 356/207 X |
| 3,528,749 | 9/1970 | Bowker.......................... | 356/206 X |
| 3,664,752 | 5/1972 | Hermibu........................ | 356/206 |
| 3,645,634 | 2/1972 | Bucher........................... | 356/206 X |
| 2,878,388 | 3/1959 | Bergson......................... | 356/206 X |

Primary Examiner—Ronald L. Wibert
Assistant Examiner—Paul K. Godwin
Attorney—Theodore E. Bieber et al.

[57] ABSTRACT

An opacity monitor for measuring the light transmissibility of gases in a furnace stack wherein a collimated light source is directed through the stack, a pair of photocells disposed to measure respectively the intensity of the source and the intensity of the light after it passes through the stack, the two measurements being balanced for normal conditions and the ratio of the two measurements being used as an indication of the opacity of the stack gas.

5 Claims, 1 Drawing Figure

3,743,430
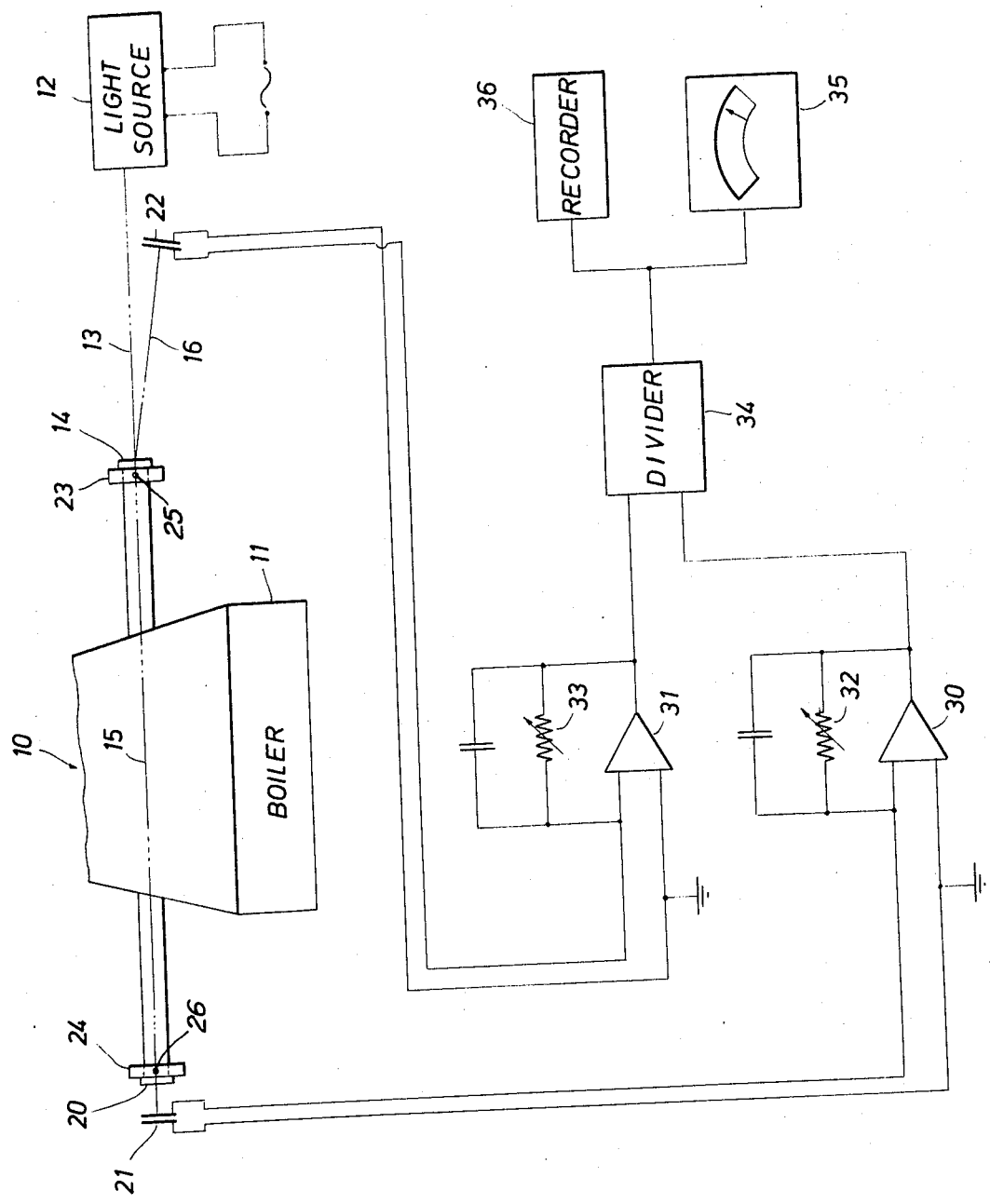

LIGHT TRANSMISSION MONITOR

BACKGROUND OF THE INVENTION

The present invention relates to a monitor for measuring the opacity of furnace stacks or boiler vents. Conventionally, it has been the practice to measure the opacity of smoke stacks by shining a light through the stack and visually observing the light to determine whether it is obscured by smoke. There have also been attempts to automate the process by detecting the light that passes through the stack by means of photosensitive devices. The resulting signals were then amplified and displayed with an attempt to correlate the resulting readings with various known standards.

The increase in legislation relating to air pollution and the requirements that smoke plumes remain with certain set standards of clarity has necessitated the need for more accurate instruments for measuring the opacity of smoke passing out a stack. Only by continually monitoring the stack is it possible to control the combustion process so that the smoke plume remains within the legislatively set limits.

While it is possible to control the combustion to maintain a clear stack utilizing present instruments, it is much preferred that the control be automatic or at least the measurement of the opacity of the smoke be automatic. The mere use of photosensitive devices to measure the amount of light transmitted to the stack will not provide a suitable answer to the problem since the intensity of the light itself can vary and thus vary the signal produced by the photosensitive device. Further, present instruments require for their calibration a complete shutdown of the monitored furnace or boiler. This is because all of the source light is not collected by the sensor and in order to calibrate the instrument, a test setup must exactly duplicate the geometry of the service installation. This has been found to be impractical.

BRIEF DESCRIPTION OF THE INVENTION

The present invention solves the above problems by using a highly collimated light source, for example, a helium-neon laser light source which is directed across the furnace stack. The stack is provided with windows through which the laser light source may pass. In addition, the windows through which the light source passes are provided with purging means for insuring that foreign materials do not deposit thereon and affect the light transmitted. For example, a stream of inert gas such as nitrogen may be passed by the windows to insure that they remain optically clear. In addition, one of the windows is tilted so that a portion of the light source is reflected. A pair of photocells are disposed to measure both the light that passes through the stack and the reflected light. The two photocells are coupled to separate operational amplifiers with the outputs being coupled to a dividing circuit whose output is either displayed on a suitable meter or recorded to provide a permanent record.

The use of two photocells, one to measure the light transmitted through the stack, and the other to measure the reflected light provides signals related to both the light transmissibility of the smoke and the intensity of the original light. Thus, if the system is initially balanced by adjusting the gain of the two operational amplifiers, it will remain balanced regardless of changes in the intensity of the light source. This will insure that the readings accurately indicate the opacity of the smoke in the stack. Further, once the system is balanced, it can be moved from one location to another without the necessity of rebalancing the system.

BRIEF DESCRIPTION OF THE DRAWINGS

The above objects and advantages of this invention will be more easily understood from the following detailed description of the preferred embodiment when taken in conjunction with the attached drawings showing a schematic circuit for carrying out the invention.

PREFERRED EMBODIMENT

Referring now to the enclosed figure, there is shown a stack 10 for exhausting the combustion gases from a boiler 11. A light source 12 is positioned so that it will transmit a beam of light along an axis 13 where it will pass through a tilted window 14. The window 14 is designed to pass a portion of light along the axis 15 which is a continuation of the axis 13 and relect a portion of the light along an axis 16. The light source 12 is preferably a highly collimated light source as, for example, a helium-neon laser light source. Also, a well collimated mercury or argon light source could also be used. The main requirement is that the light source be highly collimated so that it will produce a relatively narrow beam that can be directed along a particular axis. This is necessary so that the beam will pass through relatively small windows 14 and 20. The windows are provided with a purge means 23 and 24 to insure that foreign material does not deposit on the surface of the window and thus affect the light transmissibility of the windows. The purge means may consist of a supply of gas and a series of circumferential outlets 25 and 26 for directing the gas across the windows. Any pressurized gas, such as air or nitrogen may be used.

The light which passes through the stack 10 is intercepted by a large diameter photocell 21 placed adjacent the window 20. Similarly, the reflected light is intercepted by a photocell 22. The two photocells preferably are silicon photodiodes which provide an electrical signal related to the amount of light impinging upon them. The combination of large diameter photocells and a highly collimated light source insures that all of the light passing through the stack will strike the photocell 21. Similarly, all of the reflected light will strike the photocell 22. Silicon photodiodes produce substantially the same amplitude signal regardless of the area that is struck by the light. This, of course, assumes the same amount of light strikes the various areas.

The two photocells are coupled to separate operational amplifiers 30 and 31. Each of the operational amplifiers is provided with a feed-back circuit that includes variable resistances 32 and 33. The variable resistance is used to adjust the gain of the individual amplifiers so that under normal operating conditions or zero opacity the output signals of the two amplifiers are equal. The output side of each of the amplifiers is coupled to a dividing circuit 34 which may also consist of an operational amplifier having a suitable feed-back circuit. The dividing circuit 34 provides an output signal which is equal to the ratio of the light which passes through the stack and is intercepted by photodiode 21 divided by the reflected light. Thus, the output signal of the dividing circuit will decrease in amplitude as the opacity of the gases passing out of the stack increases. The signal from the dividing circuit may be visually displayed on a meter means 35 and/or permanently recorded on a recording means 36. The meter means may be a conventional microampere meter whose scale is calibrated to read directly in standard units. For example, the scale can be divided into corresponding Ringlemann numbers so that the output signal will correspond with the normally used units for measuring the stack opacity.

OPERATION

The monitor is first calibrated for zero opacity by setting up the source and photocells on a shop bench and adjusting the gain of amplifiers 30 and 31 so that the output indicates zero opacity. This simple calibration procedure is feasible because of the highly collimated beam and the large area photodiodes used. As long as the entire beam is intercepted by photodiode 21, the distance between the photodiode 21 and the source has little effect on the reading for zero opacity.

The monitor is then operated by installing it in a stack and accurately aligning the beam of the light source so that it will pass through the two windows 14 and 20 and strike some area on the photodiode 21. This is a relatively simple matter since the light source has a highly collimated beam which is relatively simple to aim. After the source is installed and turned on, it will operate to indicate the opacity of the stack. This information can also be recorded to provide a permanent record.

In addition to displaying or recording the output of the dividing circuit, it can also be used to control the combustion in the boiler 11. This can readily be done by controlling the air supplied to maintain the combustion within the limits that provide a clear or near zero opacity stack.

I claim as my invention:

1. An opacity monitor for monitoring the opacity of a gas flowing through a furnace stack comprising:

a collimated light source disposed to direct a narrow beam of light across said stack;

a first photocell detector disposed to measure the light transmitted across said stack and produce a first electrical signal related thereto, said first detector having sufficient surface area to intercept substantially all of the light transmitted across said stack;

a second photocell detector disposed to measure the intensity of said light source before it passes through said stack and supply a second electrical signal related thereto, said second detector having sufficient surface area to intercept substantially all of the light directed towards said second detector; and circuit means including a pair of balanced amplifiers coupled to both said first and second photocell detectors, said amplifiers including means for individually adjusting their gain whereby the combined output of the amplifiers may be balanced under normal conditions.

2. The monitor of claim 1 and wherein said circuit means includes a dividing circuit for determining the ratio of said amplifier signals.

3. The monitor of claim 1 wherein said light source is a helium-neon laser source and said photocell detectors silicon photodiodes.

4. The monitor of claim 3 wherein said light source is directed across said stack and strikes said first silicon photodiode and a tilted window is disposed in the path of said light source to deflect a portion of said light onto said second silicon photodiode before the light passes through said stack.

5. The monitor of claim 4 wherein a purge means is provided for maintaining said window free of foreign deposits.

\* \* \* \* \*